United States Patent
Rofougaran et al.

(10) Patent No.: US 8,417,204 B2
(45) Date of Patent: Apr. 9, 2013

(54) METHOD AND SYSTEM FOR ON-DEMAND SIGNAL NOTCHING IN A RECEIVER

(75) Inventors: Ahmadreza Rofougaran, Newport Coast, CA (US); Maryam Rofougaran, Rancho Palos Verdes, CA (US)

(73) Assignee: Broadcom Corporation, Irvine, CA (US)

( * ) Notice: Subject to any disclaimer, the term of this patent is extended or adjusted under 35 U.S.C. 154(b) by 1023 days.

(21) Appl. No.: 12/116,397

(22) Filed: May 7, 2008

(65) Prior Publication Data

US 2009/0280766 A1 Nov. 12, 2009

(51) Int. Cl.
*H04B 1/10* (2006.01)
*H04B 7/00* (2006.01)

(52) U.S. Cl.
USPC .......................................... 455/266; 455/307

(58) Field of Classification Search .................. 455/266, 455/339, 340, 280, 286, 293, 296, 307
See application file for complete search history.

(56) References Cited

U.S. PATENT DOCUMENTS

| | | | | |
|---|---|---|---|---|
| 3,868,605 A * | 2/1975 | Poole | ............................ | 333/176 |
| 4,524,332 A * | 6/1985 | Gay | .............................. | 330/294 |
| 6,842,086 B1 * | 1/2005 | Zennamo, Jr. | ................ | 333/175 |
| 7,136,114 B2 * | 11/2006 | Zahm et al. | ................... | 348/731 |
| 7,142,818 B2 * | 11/2006 | Hunter et al. | ................ | 455/63.1 |
| 7,738,610 B2 * | 6/2010 | Chan et al. | ..................... | 375/350 |
| 7,979,049 B2 * | 7/2011 | Oredsson et al. | .......... | 455/343.2 |
| 2003/0025623 A1 | 2/2003 | Brueske et al. | | |
| 2004/0229590 A1* | 11/2004 | Kubo et al. | .................... | 455/307 |
| 2006/0035620 A1* | 2/2006 | Millard et al. | ................ | 455/339 |
| 2006/0183456 A1 | 8/2006 | Minobe et al. | | |
| 2007/0099591 A1* | 5/2007 | Hendrix et al. | ............ | 455/343.1 |
| 2009/0042527 A1 | 2/2009 | Niknejad | | |
| 2009/0154612 A1 | 6/2009 | Rofougaran | | |
| 2009/0280765 A1 | 11/2009 | Rofougaran et al. | | |

OTHER PUBLICATIONS

USPTO Office Action dated Sep. 15, 2010 for U.S. Appl. No. 11/955,064, filed Dec. 12, 2007, Inventor: Ahmadreza Rofougaran.

* cited by examiner

*Primary Examiner* — Nguyen Vo
(74) *Attorney, Agent, or Firm* — Farjami & Farjami LLP

(57) ABSTRACT

Aspects of a method and system for on-demand signal notching in a receiver. In this regard, signal strength measurements of a received signal may enable detection of unwanted signal component(s) and one or more filters in an on-chip receiver may be configured in response to the measurements. The filter(s) may additionally be configured based on power consumption of the filter(s). Signal measurements and/or the corresponding configuration may be performed real-time. The filter(s) may be configured such that a notch in a frequency response of the filter(s) is centered at or near the unwanted component. In this manner, the unwanted component(s) may be filtered out. The filter(s) may be configured, for example, by switching one or more filter stages and/or components into and/or out of a signal path and/or by tuning one or more variable circuit elements within the filter(s).

27 Claims, 7 Drawing Sheets

METHOD AND SYSTEM FOR ON-DEMAND SIGNAL NOTCHING IN A RECEIVER

CROSS-REFERENCE TO RELATED APPLICATIONS/INCORPORATION BY REFERENCE

This patent application makes reference to:
U.S. patent application Ser. No. 11/954,962 filed on Dec. 12, 2007, published as U.S. Patent Application Publication Number 2009/0153384 A1 on Jun. 18, 2009, and issued as U.S. Pat. No. 7,965,215 on Jun. 21, 2011;
U.S. patent application Ser. No. 11/955,064 filed on Dec. 12, 2007, published as U.S. Patent Application Publication Number 2009/0154612 A1 on Jun. 18, 2009; and
U.S. patent application Ser. No. 12/116,874 filed on May 7, 2008, published as U.S. Patent Application Publication Number 2009/0280765 A1 on Nov. 12, 2009.

Each of the above stated applications is hereby incorporated herein by reference in its entirety.

FIELD OF THE INVENTION

Certain embodiments of the invention relate to signal processing. More specifically, certain embodiments of the invention relate to a method and system for on-demand signal notching in a receiver.

BACKGROUND OF THE INVENTION

Mobile communications have changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

As the number of electronic devices enabled for wireline and/or mobile communications continues to increase, significant efforts exist with regard to making such devices more power efficient. For example, a large percentage of communications devices are mobile wireless devices and thus often operate on battery power. Additionally, transmit and/or receive circuitry within such mobile wireless devices often account for a significant portion of the power consumed within these devices. Moreover, in some conventional communication systems, transmitters and/or receivers are often power inefficient in comparison to other blocks of the portable communication devices. Accordingly, these transmitters and/or receivers have a significant impact on battery life for these mobile wireless devices.

Additionally, as the number of wireless devices and wireless communications standards increase, commonly used frequency bands are becoming increasingly congested with wireless traffic. In this regard, designing devices that can reliably operate in such noisy frequency bands is becoming increasingly difficult and costly. Accordingly, efforts exist to develop wireless technologies which operate at higher, less congested frequencies.

For example, in 2001, the Federal Communications Commission (FCC) designated a large contiguous block of 7 GHz bandwidth for communications in the 57 GHz to 64 GHz spectrum. This frequency band may be used by the spectrum users on an unlicensed basis, that is, the spectrum is accessible to anyone, subject to certain basic, technical restrictions such as maximum transmission power and certain coexistence mechanisms. The communications taking place in this band are often referred to as '60 GHz communications'. With respect to the accessibility of this part of the spectrum, 60 GHz communications is similar to other forms of unlicensed spectrum use, for example Wireless LANs or Bluetooth in the 2.4 GHz ISM bands. However, communications at 60 GHz may be significantly different in aspects other than accessibility. In this regard, there may be certain drawbacks associated with 60 GHz communications. For example, 60 GHz signals may provide markedly different communications channel and propagation characteristics. In this regard, 60 GHz radiation is partly absorbed by oxygen in the air. Accordingly, 60 GHz communications suffer from increased attenuation with distance as compared to, for example, 2.4 GHz. On the other hand, there may be advantages associated with 60 GHz communications. For example, since a very large bandwidth of 7 GHz is available, very high data rates may be achieved.

Shrinking features size of CMOS processes, for example, is one factor enabling development products and technologies for 60 GHz communications. However, even when fabricated on the smallest processes, conventional methods and circuit topologies are often unable to realize signal generation circuits which can generate signals sufficiently high in frequency to enable technologies such as 60 GHz communications.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for on-demand signal notching in a receiver, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for on-demand signal notching in a receiver. In accordance with various embodiments of the invention, signal strength measurements of a received signal may enable detection of unwanted signal component(s), and one or more filters in an on-chip receiver may be configured in response to the measurements. The filter(s) may additionally be configured based on power consumption of the filter(s). Signal measurements and/or the corresponding configuration may be performed dynamically and/or in real-time. The filter(s) may be configured such that a notch in a frequency response of the filter(s) is centered at or near the unwanted component. In this manner, the unwanted component(s) may be filtered out. Unwanted components, which may be in-band and/or out-of-band, may be detected based on, for example, a comparison of the measured strength to one or more thresholds, a signal to noise ratio of the received signal, and/or a dynamic range of the received signal. The filter(s) may be configured, for example, by switching one or more filter stages and/or components into and/or out of a signal path and/or by tuning one or more variable circuit elements within the filter(s). In various embodiments of the invention, received signals may comprise a frequency at or near the industrial scientific and medical band centered at 61.25 GHz.

Figure 1A:
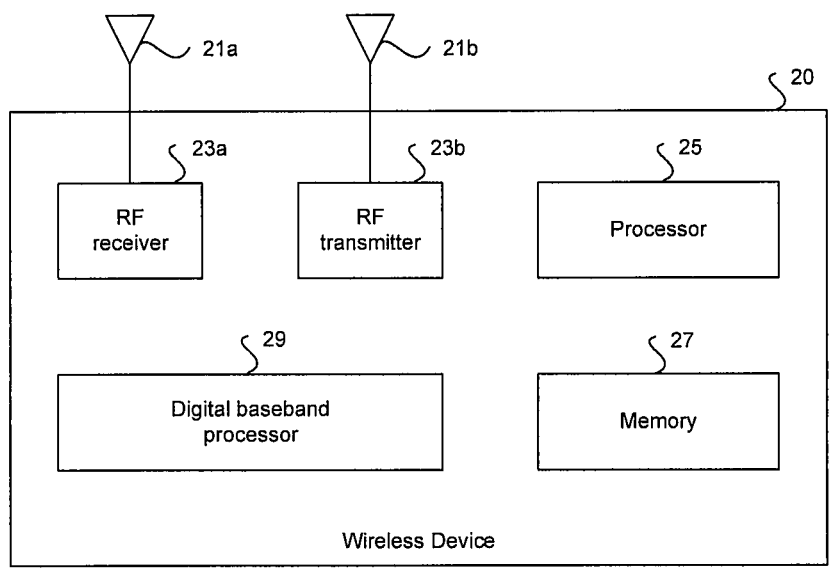
FIG. 1A is a block diagram illustrating an exemplary wireless device, in accordance with an embodiment of the invention.

FIG. 1A is a block diagram illustrating an exemplary wireless device, in accordance with an embodiment of the invention. Referring to FIG. 1A, there is shown a wireless device 20 that may comprise an RF receiver 23a, an RF transmitter 23b, a digital baseband processor 29, a processor 25, and a memory 27. A receive antenna 21a may be communicatively coupled to the RF receiver 23a. A transmit antenna 21b may be communicatively coupled to the RF transmitter 23b. The wireless device 20 may transmit and receive information utilizing high data rate, line-of-site communications operating at extremely high frequency (EHF) such as the ISM band centered at 61.25 GHz.

The RF receiver 23a may comprise suitable logic, circuitry, and/or code that may enable processing of received RF signals. The RF receiver 23a may enable receiving RF signals in a plurality of frequency bands. For example, the RF receiver 23a may enable receiving signals in extremely high frequency (e.g., 60 GHz) bands. The receiver 23a may be as described with respect to FIG. 1A, for example. In this regard, the receiver 23a may be enabled to receive, filter, amplify, down-convert, and/or perform analog to digital conversion. Moreover, filtering in the receiver 23a may be dynamically controlled, and thus power efficiency of the receiver 23a may be improved over conventional receivers. In various embodiments of the invention, the wireless device 20 may comprise a plurality of the receivers 23a and may thus support multiple frequency bands and or simultaneous reception of signals in the same frequency band. In various embodiments of the invention, the RF receiver 23a may down convert a received RF signal to baseband or to an intermediate frequency (IF). Additionally, the receiver 23a may perform quadrature down-conversion where in-phase components and quadrature phase components may be processed in parallel.

The digital baseband processor 29 may comprise suitable logic, circuitry, and/or code that may enable processing and/or handling of baseband signals. In this regard, the digital baseband processor 29 may process or handle signals received from the RF receiver 23a and/or signals to be transferred to the RF transmitter 23b, when the RF transmitter 23b is present, for transmission to the network. The digital baseband processor 29 may also provide control and/or feedback information to the RF receiver 23a and to the RF transmitter 23b based on information from the processed signals. In this regard, the baseband processor 29 may provide a control signal to one or more of SSI 104, the LNA 110, the mixer 112, the filter 114 (and possibly 106 and 108), and/or the ADC 116.

The digital baseband processor 29 may communicate information and/or data from the processed signals to the processor 25 and/or to the memory 27. Moreover, the digital baseband processor 29 may receive information from the processor 25 and/or to the memory 27, which may be processed and transferred to the RF transmitter 23b for transmission to the network.

The RF transmitter 23b may comprise suitable logic, circuitry, and/or code that may enable processing of RF signals for transmission. The RF transmitter 23b may enable transmission of RF signals in a plurality of frequency bands. For example, the RF transmitter 23b may enable transmitting signals in extremely high frequency (EHF) bands such as the ISM centered at 61.25 GHz. Each frequency band supported by the RF transmitter 23b may have a corresponding front-end circuit for handling amplification and up conversion operations, for example. In this regard, the RF transmitter 23b may be referred to as a multi-band transmitter when it supports more than one frequency band. In another embodiment of the invention, the wireless device 20 may comprise more than one RF transmitter 23b, wherein each of the RF transmitter 23b may be a single-band or a multi-band transmitter. In various embodiments of the invention, the RF transmitter 23b may perform direct up conversion of the baseband signal to an RF signal. In some instances, the RF transmitter 23b may enable digital-to-analog conversion of the baseband signal components received from the digital baseband processor 29 before up conversion. In other instances, the RF transmitter 23b may receive baseband signal components in analog form.

The processor 25 may comprise suitable logic, circuitry, and/or code that may enable control and/or data processing operations for the wireless device 20. The processor 25 may be utilized to control at least a portion of the RF receiver 23a, the RF transmitter 23b, the digital baseband processor 29, and/or the memory 27. In this regard, the processor 25 may generate at least one signal for controlling operations within the wireless device 20. In this regard, the processor 25 may provide a control signal to one or more of SSI 104, the LNA 110, the mixer 112, the filter 114 (and possibly 106 and 108), and/or the ADC 116. The processor 25 may also enable executing of applications that may be utilized by the wireless device 20. For example, the processor 25 may execute applications that may enable displaying and/or interacting with content received via EHF communications.

The memory 27 may comprise suitable logic, circuitry, and/or code that may enable storage of data and/or other information utilized by the wireless device 20. For example, the memory 27 may be utilized for storing processed data generated by the digital baseband processor 29 and/or the processor 25. The memory 27 may also be utilized to store information, such as configuration information, that may be utilized to control the operation of at least one block in the wireless device 20. For example, the memory 27 may comprise information necessary to configure the RF receiver 23a to enable receiving signals at various signal levels and in the presence of varying amounts of interference. In this regard, the memory may store control and/or configuration information for one or more of the SSI 104, the LNA 110, the mixer 112, the filter 114 (and possibly 106 and 108), and/or the ADC 116.

Figure 1B:
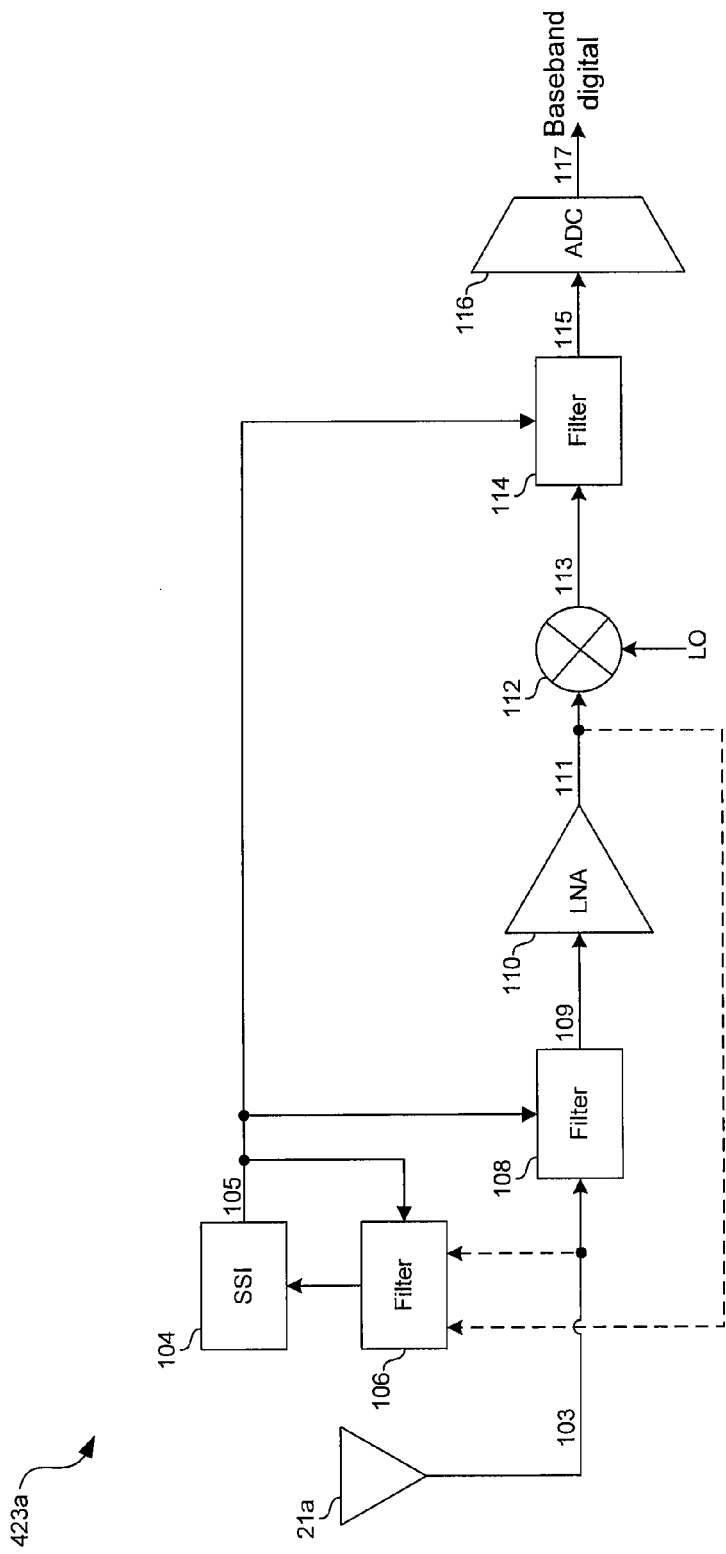
FIG. 1B is a block diagram of an exemplary receiver with on-demand filtering, in accordance with an embodiment of the invention.

FIG. 1B is a block diagram of an exemplary receiver with on-demand signal notching, in accordance with an embodiment of the invention. Referring to FIG. 1B the receiver 23a may comprise a signal strength indicator (SSI) 104, filters 106, 108, and 114, low noise amplifier (LNA) 110, mixer 112, and analog-to-digital converter (ADC) 116. In various embodiments of the invention, the components of the receiver 423a may reside on a common substrate, such as a silicon die. In this regard, the receiver 423a may be referred to as a system on chip.

The SSI 104 may comprise suitable logic, circuitry, and/or code that may enable determining signal strength. In this regard, the SSI 104 may, for example, be enabled to measure current, voltage and/or power of the signal 103 and/or 111. Additionally, the SSI 104 may be enabled to generate one or more control signals 105, which, in various embodiments of the invention, may be coupled to one or more of the filters 106, 108, and 114. In various embodiments of the invention, the signal 105 may be a digital and/or analog signal representation of the current, voltage, and/or power of the signal 103 and/or 111.

The filter 106 may comprise suitable logic, circuitry, and/or code for attenuating undesired frequencies to a greater extent than desired frequencies. In this regard, the filter 106 may have, for example, a bandpass frequency response. The filter 108 may be tunable such that a bandwidth and/or center frequency characterizing the frequency response of the filter may be adjustable. In this manner, the filter 106 may be controlled such that the SSI 104 may perform measurements of desired frequencies, bandwidths, etc. Additionally, the filter 106 may be configured based on measurements performed by the SSI 104. In this regard, one or more components and/or stages of the filter 106 may be switched into and/or out a signal path of the filter 108 to control, for example, a gain, a bandwidth, a center frequency, and/or a passband and/or stopband response. Exemplary passband and/or stopband responses comprise Butterworth, Chebyshev, Cauer, Bessel, of the filter 106.

The filter 108 may comprise suitable logic, circuitry, and/or code for attenuating undesired frequencies to a greater extent than desired frequencies. The filter 108 may be configurable such that one or more poles and/or zeros characterizing the frequency response of the filter 108 may be added, removed, and/or adjusted. In this manner, by adding, removing, or adjusting poles and/or zeros characterizing the frequency response of the filter 108, aspects of the invention may enable tuning the receiver 423a to a desired frequency (e.g. 60 GHz) and attenuating interference and/or noise.

The filter 114 may comprise suitable logic, circuitry, and/or code for attenuating undesired frequencies to a greater extent than desired frequencies. In this regard, the filter 114 may have, for example, a bandpass frequency response. The filter 114 may be configurable such that one or more poles and/or zeros characterizing the frequency response of the filter 114 may be added, removed, and/or adjusted. In this manner, by adding, removing, or adjusting zeros characterizing the frequency response of the filter 108, aspects of the invention may enable rejecting undesired inter-modulation products output by the mixer 112 while passing desired intermodulation products.

The mixer 112 may comprise suitable logic, circuitry, and/or code that may enable generation of inter-modulation products resulting from the mixing of a received RF signal and a local oscillator (LO). The frequency of the LO signal may be determined based on the desired frequency/channel to be received. In this regard, the mixer 112 may enable downconverting, for example, RF signals of a range of frequencies to a fixed intermediate frequency (IF) or directly to baseband.

The LNA 110 may comprise suitable logic, circuitry, and/or code that may enable buffering and/or amplification of received RF signals. In this regard, the gain of the LNA 110 may be adjustable to enable reception of signals of varying strength. Accordingly, the output 111 of the LNA 110 may be measured (e.g., by the SSI 104) and the gain of the LNA 110 may be adjusted to maintain the signal 111 within determined limits.

The ADC 116 may comprise suitable logic, circuitry, and/or code that may enable conversion of analog signals to a digital representation. In this regard, the ADC 116 may, for example, sample and quantize analog signal 115 at times specified by a sample clock. Accordingly, the ADC 116 may receive one or more control signals from, for example, a processor and/or a clock generator.

In operation, an RF signal received by the antenna 21a and/or the LNA output 111 may be measured real-time to determine signal strength of in-band and/or out-of-band signals. In this regard, in-band may refer to signals within a passband of the filter 108 while out-of-band signals may fall in a stopband of the filter 108. The filter 106 may be adjusted and/or tuned and measurements may be taken at various frequencies and/or bandwidths in order to determine the in-band and/or out-of-band signal strengths. Alternatively, the SSI 104 may be enabled to determine other exemplary characteristics such as signal to noise ratio, dynamic range, etc.) of the received signal by, for example, performing a fast Fourier transform analysis of the signal 103 and/or 111.

Figure 1C:
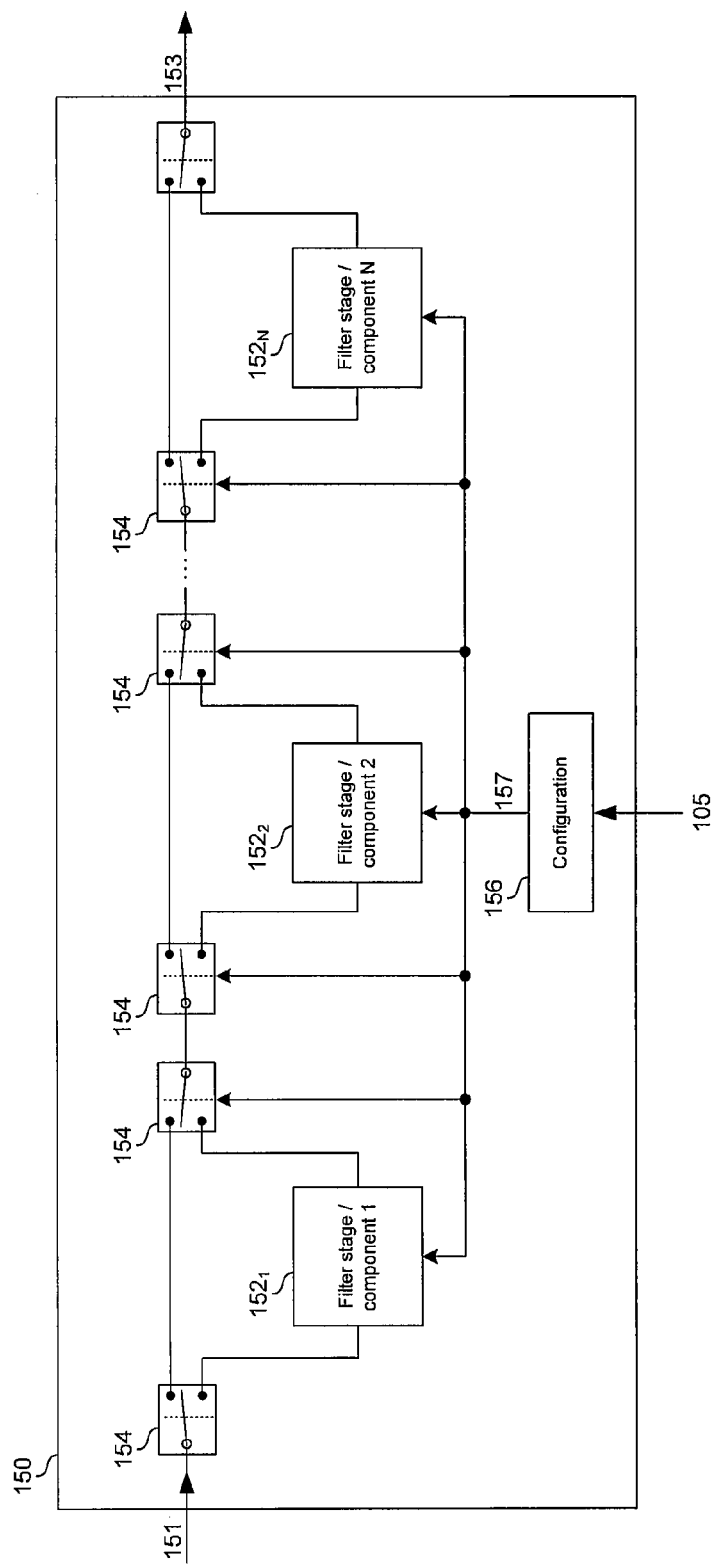
FIG. 1C is a block diagram of an exemplary configurable filter, in accordance with an embodiment of the invention.

FIG. 1C is a block diagram of an exemplary configurable filter, in accordance with an embodiment of the invention. Referring to FIG. 1C there is shown a filter 150 comprising a plurality of filter stages and/or components 152 and plurality of switching elements 154.

Each of the filter stages and/or components 152 may comprise suitable logic, circuitry, and/or code for affecting the response of the filter 150. Additionally, each of the stages and/or components 152 may be tunable or otherwise configurable via one or more signals 205. For example, each stage and/or components 152 may comprise one or more variable capacitors, inductors, and/or resistors, which may be controlled via one or more signals 157 generated by the configuration block 156. Furthermore, each stage and/or components 152 or a portion thereof may be powered down when not switched into a signal path of the receiver 23a.

The configuration block 156 may comprise suitable logic, circuitry, and/or code for configuring the filter 150 based on the signal(s) 205 generated by the SSI 104. In this regard, the configuration block 156 may generate one or more signals 157 for tuning the stages and/or components 152 and for switching the stages and/or components 152 in and/or out of the signal path via the switching elements 152 based on the signal(s) 105 generated by the SSI 104. In this manner, the filter 150 may be configured real-time in response to measurements of signals received by the receiver 23a.

In operation, switching one or more of the stages and/or components 152 into and/or out of the signal path, via the switching elements 154, may enable adding or removing poles and/or zeros from the frequency response of the filter 150. Additionally, tuning the stages and/or components 152 that are switched into the signal path may enable adjusting the frequency of poles and/or zeros. For example, in instances where a strong signal component may be measured at a frequency other than a desired frequency, then various aspects of the invention may enable adding one or more poles and/or zeros to the filter 150 and/or adjusting the frequency of one or more poles and/or zeros such that a notch in the response of the filter may attenuate the undesired signal component. In this regard, a notch may be introduced at an undesired frequency in instances that measured signal strength at the undesired frequency may be greater than a threshold. In this regard, a threshold(s) to which the signal measurement may be compared may be dynamically determined based on characteristics, such as dynamic range and signal to noise ratio, of a received signal.

Figure 2A:
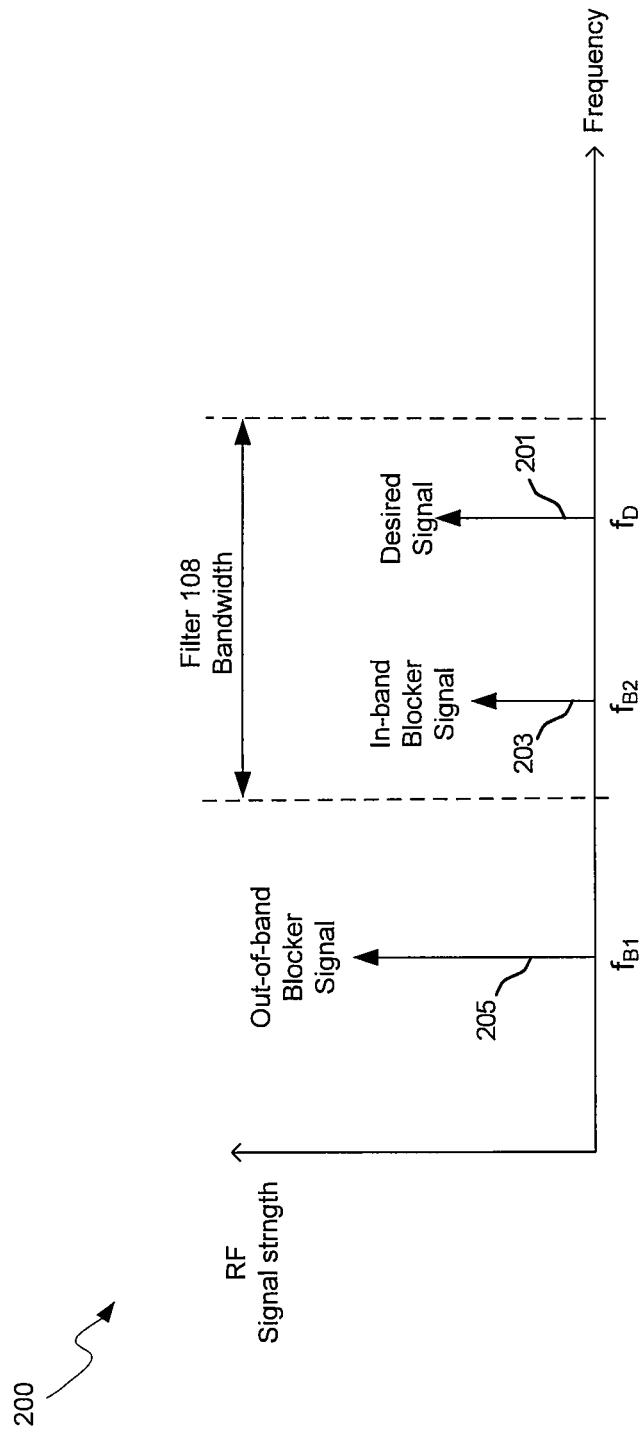
FIG. 2A is a diagram illustrating an exemplary frequency spectrum of signals arriving at a receiver with on-demand signal notching, in accordance with an embodiment of the invention.

FIG. 2 is a diagram illustrating an exemplary frequency spectrum of signals arriving at a receiver with on-demand signal notching, in accordance with an embodiment of the invention. Referring to FIG. 2, there is shown a signal 200 comprising a desired component 201, in-band blocker (interference) signal component 203, and out-of-band blocker (interference) signal component 205. Accordingly, the SSI 104 may be enabled to measure the strength of the signal components 201, 203, and/or 205 and adjust the frequency response of one or more filters in the receiver 23a in response to the measurements. In this manner, the receiver 23a may be configured dynamically and/or in real-time in response to characteristics of signals it is receiving. In an exemplary embodiment of the invention, the signal component 201 may be a desired channel, the signal component 205 may be an adjacent channel, and the signal component 203 may be interference from, for example, a different technology or wireless standard.

Figure 2B:
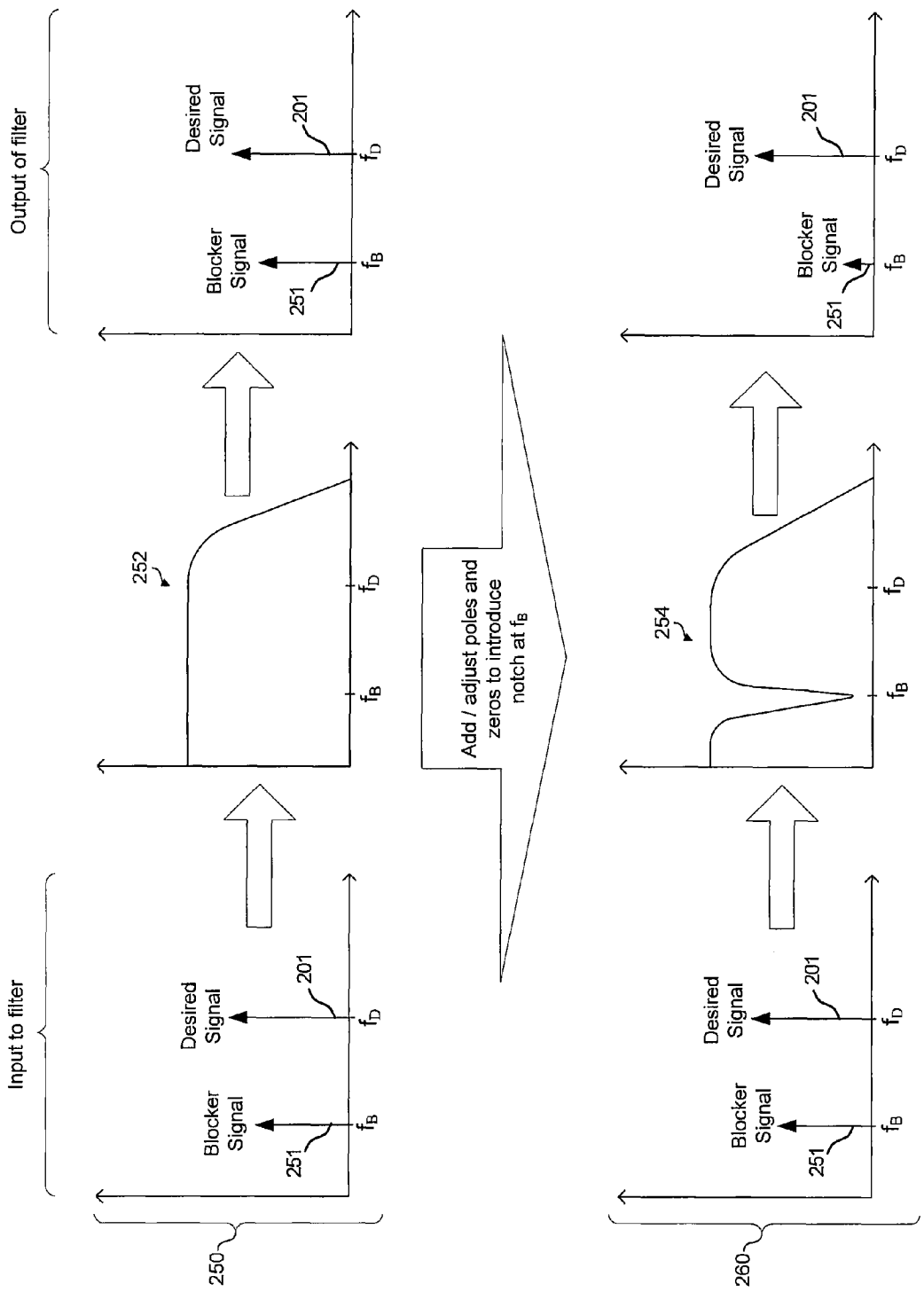
FIG. 2B is a diagram that illustrates introduction of a notch in a filter response to attenuate a blocker (interference) signal, in accordance with an embodiment of the invention.

FIG. 2B is a diagram that illustrates introduction of a notch in a filter response to attenuate a blocker (interference) signal, in accordance with an embodiment of the invention. Referring to FIG. 2B there is shown two filtering operations 250 and 260 in which a desired signal 201 and an undesired signal 251 may be input to a filter such as the filter 108 or 114.

For the filtering operation 250, the filter may have frequency response 252. Consequently, because $f_D$ and $f_B$ are both in the passband of the response 252, the undesired signal 251 may be present at the output of the filter.

Accordingly, various aspects of the invention may enable configuring the filter such that the frequency response of the filter may be altered from the frequency response 252 to the frequency response 254. In this regard, one or more poles and/or zeros may be added, removed, and/or adjusted in frequency to create a notch centered at $f_B$.

Thus, for the filtering operation 260, $f_D$ may be in a passband of the frequency response 254 and $f_B$ may be notched. Consequently, the undesired signal 251 may be attenuated at the output of the filter.

Figure 2C:
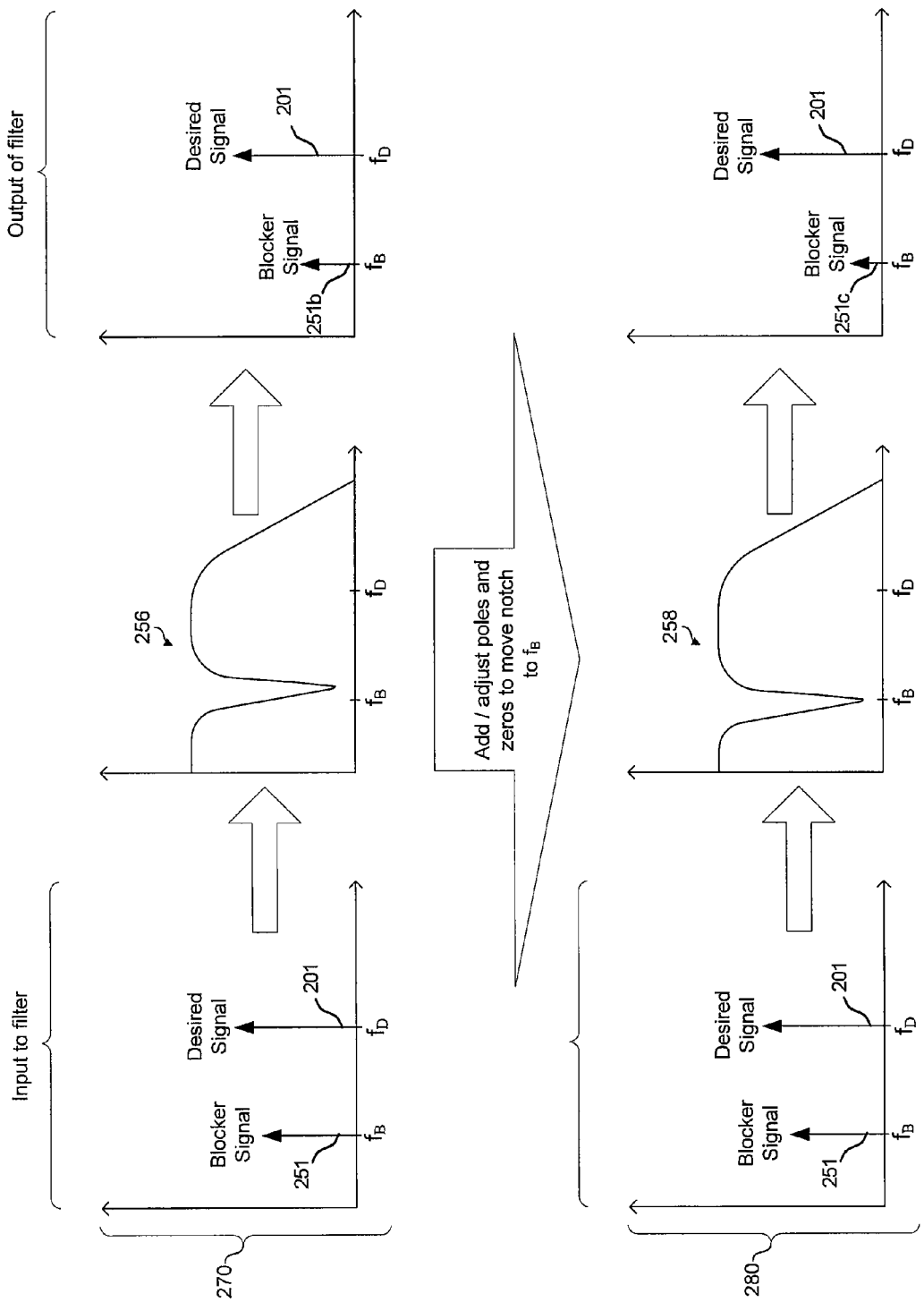
FIG. 2C is a diagram that illustrates adjustment of a frequency of a notch to attenuate a blocker (interference) signal, in accordance with an embodiment of the invention.

FIG. 2C is a diagram that illustrates adjustment of a frequency of a notch to attenuate a blocker (interference) signal, in accordance with an embodiment of the invention. Referring to FIG. 2C there is shown two filtering operations 270 and 280 in which a desired signal 201 and an undesired signal 251 may be input to a filter such as the filter 108 or 114.

For the filtering operation 270, the filter may have frequency response 256. Consequently, because the notch in the frequency response may not be centered on $f_B$, the undesired signal 251 may still be present at the output of the filter.

Accordingly, aspects of the invention may enable configuring the filter such that the frequency response may be altered from the frequency response 256 to the frequency response 258. In this regard, one or more poles and/or zeros may be added, removed, and/or adjusted in frequency to adjust the notch such that it may be centered at $f_B$.

Thus, for the filtering operation 280, $f_D$ may be in a passband of the frequency response 258 and $f_B$ may be notched. Consequently, the undesired signal 251 may be attenuated at the output of the filter.

Figure 3:
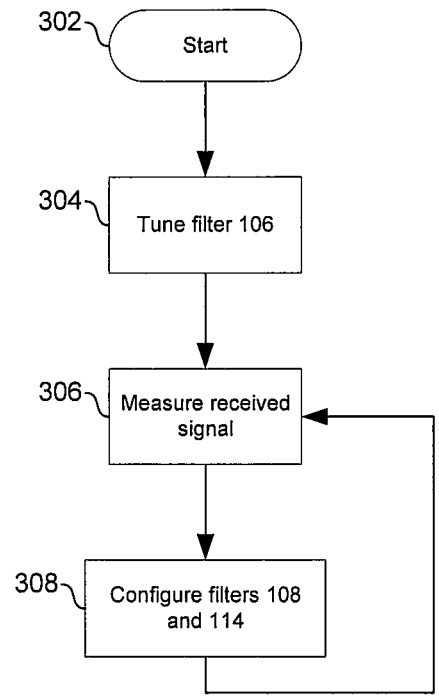
FIG. 3 is a flow chart illustrating exemplary steps for on-demand signal notching in a receiver, in accordance with an embodiment of the invention.

FIG. 3 is a flow chart illustrating exemplary steps for on-demand signal notching in a receiver, in accordance with an embodiment of the invention. Referring to FIG. 3 the exemplary steps may begin with start step 302 when signals may be received by the antenna 21a. Subsequent to step 302, the exemplary steps may advance to step 304. In step 304, the filter 106 may be tuned to control which frequencies may be measured by the SSI 104. For example, the filter 106 may sweep one or more frequency bands to characterize the environment in which the receiver 23a may be operating. Subsequent to step 304, the exemplary steps may advance to step 306.

In step 306, the SSI 104 may provide a measure of the signal strength of the signal 103 and/or 111. Accordingly, the signal 105 generated by the SSI 104 may be based, at least in part, on the results of the measurement of the signal 103 and/or 111. For example, the signal 105 may be a DC voltage which may be compared to one or more reference voltages to configure the filters 108 and 114. In another embodiment of the invention, the signal 105 may be a periodic signal and a characteristic(s) such as phase, frequency, duty cycle, etc. of the signal 105 may, at least in part, be utilized to configure the filters 108 and 114. Subsequent to step 306, the exemplary steps may advance to the step 308.

In step 308, the filters 108 and 114 may be configured based on the signal(s) 105. In this regard, the filter 108 may be configured to notch out strong undesired signal components in a received signal. Similarly, the filter 114 may be configured to notch out strong undesired signals output by the mixer 112.

Subsequent to step 308, the exemplary steps may return to step 306. In this regard, the process of monitoring signal levels and configuring the filters 108 and 114 to notch out undesired signal components may be based on periodic or continuous feedback to improve performance of the receiver 23a.

Exemplary aspects of a method and system for on-demand signal notching in a receiver. In this regard, signal strength measurements of a received signal may enable detection of unwanted signal component(s) 203 and/or 205 and one or more filters 150 in an on-chip receiver 23a may be configured in response to the measurements. The filter(s) 150 may additionally be configured based on power consumption of the filter(s) 150. Signal measurements and/or the corresponding configuration may be performed real-time. The filter(s) 150 may be configured such that a notch in a frequency response of the filter(s) 150 is centered at or near the unwanted component. In this manner, the unwanted component(s) may be filtered out. Unwanted components, which may be in-band signals 203 and/or out-of-band signal 205, may be detected based on, for example, a comparison of the measured strength to one or more thresholds, a signal to noise ratio of the received signal, and/or a dynamic range of the received signal. The filter(s) 150 may be configured, for example, by switching one or more filter stages and/or components 152 into and/or out of a signal path and/or by tuning one or more variable circuit elements within the filter(s). In various embodiments of the invention, received signals may be of frequency at or near the industrial scientific and medical band centered at 61.25 GHz.

Another embodiment of the invention may provide a machine-readable storage, having stored thereon, a computer program having at least one code section executable by a machine, thereby causing the machine to perform the steps as described herein for on-demand signal notching in a receiver.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a)

conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for signal processing, the method comprising:
   detecting an unwanted component of a signal received in a receiver integrated on-chip, by measuring a strength of the received signal at an antenna;
   responsive to the detecting, configuring one or more filters within the integrated on-chip receiver based on power consumption of the one or more filters and such that a notch in a frequency response of the one or more filters is centered at or near the unwanted component of the received signal, said notch centered by adjusting one or more poles and zeros; and
   filtering the unwanted component of the received signal via the configured one or more filters.

2. The method according to claim 1, comprising detecting the unwanted component by comparing the strength of the signal to one or more thresholds.

3. The method according to claim 2, comprising determining the one or more thresholds based on signal to noise ratio of the received signal.

4. The method according to claim 2, comprising determining the one or more thresholds based on a dynamic range of the received signal.

5. The method according to claim 1, wherein the unwanted components are in-band and/or out-of-band.

6. The method according to claim 1, comprising configuring the one or more filters by switching one or more stages of the filter into and/or out of a signal path.

7. The method according to claim 1, comprising configuring the one or more filters by tuning one or more variable circuit elements within the filter.

8. The method according to claim 1, wherein the received signal is of frequency at or near the industrial scientific and medical band centered at 61.25 GHz.

9. The method according to claim 1, wherein the detecting and/or the configuring occurs real-time.

10. A machine-readable non-transitory tangible storage having stored thereon, a computer program having at least one code section for signal processing, the at least one code section being executable by a machine for causing the machine to perform steps comprising:
    detecting an unwanted component of a signal received in a receiver integrated on-chip, by measuring a strength of the received signal at an antenna;
    responsive to the detecting, configuring one or more filters within the integrated on-chip receiver based on power consumption of the one or more filters and such that a notch in a frequency response of the one or more filters is centered at or near the unwanted component of the received signal, said notch centered by adjusting one or more poles and zeros; and
    filtering the unwanted component of the received signal via the configured one or more filters.

11. The machine-readable non-transitory tangible storage according to claim 10, wherein the at least one code section comprises code for detecting the unwanted component by comparing the strength of the signal to one or more thresholds.

12. The machine-readable non-transitory tangible storage according to claim 11, wherein the at least one code section comprises code for determining the one or more thresholds based on signal to noise ratio of the received signal.

13. The machine-readable non-transitory tangible storage according to claim 11, wherein the at least one code section comprises code for determining the one or more thresholds based on a dynamic range of the received signal.

14. The machine-readable non-transitory tangible storage according to claim 10, wherein the unwanted components are in-band and/or out-of-band.

15. The machine-readable non-transitory tangible storage according to claim 10, wherein the at least one code section comprises code for configuring the one or more filters by switching one or more stages of the filter into and/or out of a signal path.

16. The machine-readable non-transitory tangible storage according to claim 10, wherein the at least one code section comprises code for configuring the one or more filters by tuning one or more variable circuit elements within the filter.

17. The machine-readable non-transitory tangible storage according to claim 10, wherein the received signal is of frequency at or near the industrial scientific and medical band centered at 61.25 GHz.

18. The machine-readable non-transitory tangible storage according to claim 10, wherein the detecting and/or the configuring occurs real-time.

19. A system for signal processing, the system comprising:
    one or more circuits operable to detect an unwanted component of a signal received in a receiver integrated on-chip, by measuring a strength of the received signal at an antenna;
    responsive to the detection, the one or more circuits are operable to configure one or more filters within the receiver such that a notch in the frequency response of the one or more filters is centered at or near the unwanted component, said notch centered by adjusting one or more poles and zeros.

20. The system according to claim 19, wherein the one or more circuits are operable to detect the unwanted component by a comparison of the strength of the signal to one or more thresholds.

21. The system according to claim 20, wherein the one or more circuits are operable to determine the one or more thresholds based on a signal to noise ratio of the received signal.

22. The system according to claim 20, wherein the one or more circuits are operable to determine the one or more thresholds based on a dynamic range of the received signal.

23. The system according to claim 19, wherein the unwanted components are in-band and/or out-of-band.

24. The system according to claim 19, wherein the one or more circuits are operable to configure the one or more filters by switching one or more stages of the filter into and/or out of a signal path.

25. The system according to claim 19, wherein the one or more circuits are operable to configure the one or more filters by tuning one or more variable circuit elements within the filter.

26. The system according to claim 19, wherein the received signal is of frequency at or near the industrial scientific and medical band centered at 61.25 GHz.

27. The system according to claim 19, wherein the detection and/or the configuring occurs real-time.

* * * * *